(12) United States Patent
Gstach et al.

(10) Patent No.: US 11,168,472 B2
(45) Date of Patent: Nov. 9, 2021

(54) PROFILE RAIL END CAP WITH NAIL HOLDER

(71) Applicant: Hilti Aktiengesellschaft, Schaan (LI)

(72) Inventors: Peter Gstach, Bludesch (AT); Andrin Nigg, Triesen (LI)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/629,723

(22) PCT Filed: Jul. 3, 2018

(86) PCT No.: PCT/EP2018/067956
§ 371 (c)(1),
(2) Date: Jan. 9, 2020

(87) PCT Pub. No.: WO2019/011723
PCT Pub. Date: Jan. 17, 2019

(65) Prior Publication Data
US 2021/0087807 A1    Mar. 25, 2021

(30) Foreign Application Priority Data

Jul. 10, 2017   (EP) .................................... 17180411

(51) Int. Cl.
*E04B 1/41*   (2006.01)
*E04B 1/58*   (2006.01)
*E04B 1/38*   (2006.01)

(52) U.S. Cl.
CPC .......... *E04B 1/4107* (2013.01); *E04B 1/5806* (2013.01); *E04B 2001/405* (2013.01)

(58) Field of Classification Search
CPC . E04B 1/4107; E04B 1/5806; E04B 2001/405
See application file for complete search history.

(56) References Cited

U.S. PATENT DOCUMENTS

| 4,948,313 A | 8/1990 | Zankovich |
| 9,574,589 B2* | 2/2017 | Knutson ................. F16L 3/243 |
| 2014/0250825 A1* | 9/2014 | Richardson ............ F16B 7/187 |
| | | 52/710 |
| 2018/0094422 A1* | 4/2018 | Getz ...................... E04B 1/2403 |

FOREIGN PATENT DOCUMENTS

| CN | 203193078 U | 9/2013 |
| DE | 1 814 195 U | 6/1960 |
| DE | 1 245 062 B | 7/1967 |

(Continued)

OTHER PUBLICATIONS

PCT/EP2018/067956, International Search Report dated Sep. 4, 2018 (Two (2) pages).

(Continued)

*Primary Examiner* — Patrick J Maestri
(74) *Attorney, Agent, or Firm* — Crowell & Moring LLP

(57) ABSTRACT

An end cap for a profile rail includes a connector for connecting the end cap to the profile rail and a fastening leg, where the fastening leg defines an opening and where a fastening pin is guidable through the opening to mount the profile rail. The opening has a cross-sectional constriction and the fastening pin is holdable in the opening by the cross-sectional constriction.

10 Claims, 2 Drawing Sheets

(56) References Cited

FOREIGN PATENT DOCUMENTS

| | | |
|---|---|---|
| DE | 29 41 887 A1 | 4/1981 |
| DE | 29 16 005 C2 | 5/1981 |
| DE | 10 2010 029 040 A1 | 11/2011 |
| DE | 20 2012 010 104 U1 | 3/2013 |
| DE | 10 2013 019 732 A1 | 5/2015 |
| DE | 20 2015 003 443 U1 | 5/2015 |
| EP | 2 881 523 A1 | 6/2015 |
| GB | 687272 | 2/1953 |
| NL | 6606508 A | 11/1966 |

OTHER PUBLICATIONS

English Machine Translation of DE 1814195 U, previously cited as Reference B1 on Jan. 9, 2020 (Three (3) pages).
English machine translation of DE 29 16 005 B1/C2, which was previously cited as reference B2 on Jan. 9, 2020 (Six (6) pages).

* cited by examiner

PROFILE RAIL END CAP WITH NAIL HOLDER

CROSS REFERENCE TO RELATED APPLICATIONS

This application claims the priority of International Application No. PCT/EP2018/067956, filed Jul. 3, 2018, and European Patent Document No. 17180411.5, filed Jul. 10, 2017, the disclosures of which are expressly incorporated by reference herein.

BACKGROUND AND SUMMARY OF THE INVENTION

The invention relates to an end cap for a profile rail. An end cap of this kind is designed having a connector for connecting the end cap to the profile rail and having at least one opening, through which a fastening pin can be guided in order to mount the profile rail, in particular on a formwork. The invention further relates to a rail arrangement comprising a profile rail and an end cap of this kind, and a fastening arrangement comprising a rail arrangement of this kind and a fastening pin.

Profile rails designed as anchor rails are known for fastening attachments, for example curtain walls, to concrete elements. Anchor rails of this kind are commonly fixed to the formwork of the concrete element, for example nailed thereto, and then embedded in the concrete. In order to prevent concrete penetrating the end face of the anchor rails and/or in order to provide resistance for fastening pins for fastening the anchor rails to the formwork, an anchor rail can have an end cap. End caps for anchor rails, in particular having openings for fastening pins for fixing the anchor rails to a formwork, are known for example from DE2916005 C2, US2014250825 A1, DE1814195 U and GB687272 A.

The object of the invention is to specify an end cap for a profile rail, a rail arrangement comprising a profile rail and an end cap of this kind, and a fastening arrangement comprising an end cap of this kind, a profile rail and a fastening pin, which make it possible to install the profile rail on a formwork particularly easily, precisely and reliably with low expenditure, in particular production expenditure.

An end cap according to the invention is characterized in that the at least one opening of the end cap has a local cross-sectional constriction for pre-fixing the fastening pin in the opening.

A first basic concept of the invention can be considered that of providing a means for pre-fixing the fastening pin, i.e., in particular the nail, in the opening during installation. This means for pre-fixing the fastening pin temporarily holds the fastening pin on the profile rail during installation, and the fastening pin is automatically brought, together with the profile rail, to its correct position in order to fix the profile rail to the formwork. In particular, this can make installation by only a single fitter, preferably without other aids, particularly easy. According to another basic concept of the invention, the means for pre-fixing the fastening pin is formed by a local, i.e., only partial, cross-sectional constriction in the opening. This cross-sectional constriction can be in contact with the fastening pin, in particular the shank thereof, and thereby secure the fastening pin against inadvertently coming loose under the forces that typically occur during installation, i.e., the cross-sectional constriction can pre-fix the fastening pin. At the same time, the pre-fixing brought about by the cross-sectional constriction can be sufficiently loose to permit subsequent penetration of the fastening pin into the formwork and, consequently, a movement of the fastening pin relative to the end cap. This can be ensured in a particularly simple and simultaneously reliable manner by means of a cross-sectional constriction.

The end cap consists preferably of a plastics material. The connector can be designed, for example, as a plug and socket connector. Preferably, the connector can be a plug-in connector which can be plugged into the profile rail, preferably into a rail body of the profile rail, in order to connect the end cap to the profile rail. For a particularly good connection to the profile rail, in particular by increasing the friction with the profile rail, the connector can comprise ribs, for example.

The opening is in particular arranged such that the fastening pin can be guided through the opening in order to install the profile rail on a formwork, i.e., the opening expediently extends perpendicularly to the longitudinal extension of the profile rail, perpendicularly to the longitudinal extension of the optionally present plug-in connector and/or perpendicularly to a plane which is spanned by a rail slot of the profile rail.

The fastening pin is used in particular to fix the end cap, and therefore the profile rail, to a formwork. The fastening pin may be a nail or a screw. The fastening pin suitably comprises a head and a shank, the head expediently having a larger cross section than the opening in order to hold the end cap. Preferably, the cross-sectional constriction is designed such that the cross-sectional constriction acts against the shank of the fastening pin in order to pre-fix the fastening pin.

The profile rail expediently comprises a rail slot flanked by rail lips, to which slot hammer head elements, such as hammer head bolts, can be fixed. In particular, the profile rail can be an anchor rail. An anchor rail of this kind comprises at least one anchor which protrudes from the rail body of the profile rail.

It is particularly preferable for the cross-sectional constriction to be formed by tabs. These tabs protrude into the cross section of the opening and therefore form the cross-sectional constriction. An embodiment of this kind can be realized in a particularly simple manner in terms of production and is simultaneously particularly reliable. Preferably, the tabs are formed integrally with the end cap, which can simplify production, for example in an injection molding method, even further. Preferably, the tabs are each circular sector-shaped.

The opening of the end cap can in particular be a through-opening. A membrane can also be provided which can be penetrated by the fastening pin and which closes the opening partially or completely. This membrane can in particular be flashing which is produced during an injection molding process. In particular, the opening can be cylindrical. The end cap preferably surrounds the opening in the manner of a ring.

Moreover, it is advantageous that the cross-sectional constriction is arranged at one end of the opening, in particular at an end of the opening that is remote from the formwork. The space created in the opening as a result can accommodate a deformation of the tabs particularly well. Moreover, the production expenditure can be reduced further, in particular in an injection molding method, as removal from the mold can be made easier.

In another preferred embodiment of the invention, it comprises a centering marking for centering the profile rail. This centering marking is expediently arranged in the extension of the rail slot of the profile rail connected to the end cap. The centering marking can make it even easier to correctly position the profile rail with particularly low production expenditure. Preferably, the centering marking is a centering notch. A centering notch of this kind is particularly visible and can be manufactured in a particularly easy and material-saving manner.

Expediently, the end cap comprises reinforcing ribbing, as a result of which particularly good mechanical properties can be achieved using a particularly low amount of material.

The invention relates to the intended use of the end cap. In particular, the invention therefore relates to a rail arrangement comprising a profile rail and an end cap according to the invention, the end cap being connected to the profile rail by means of the connector 1 and the end cap preferably closing the profile rail at the end. In particular, the invention further relates to a fastening arrangement comprising a rail arrangement according to the invention and a fastening pin, which is arranged in the opening of the end cap and held therein by the cross-sectional constriction.

As already mentioned above, the fastening pin is preferably a nail or a screw.

Features which are to be explained in connection with the end cap, rail arrangement or fastening arrangement according to the invention should not limited to this concept, but can also be used with other concepts of the end cap, rail arrangement or fastening arrangement, respectively.

The invention is explained in greater detail in the following with reference to preferred embodiments, which are shown schematically in the accompanying drawings, it being possible to implement individual features of the embodiments shown in the following in principle individually or in any desired combination within the context of the invention.

DETAILED DESCRIPTION OF THE DRAWINGS

Figure 1:
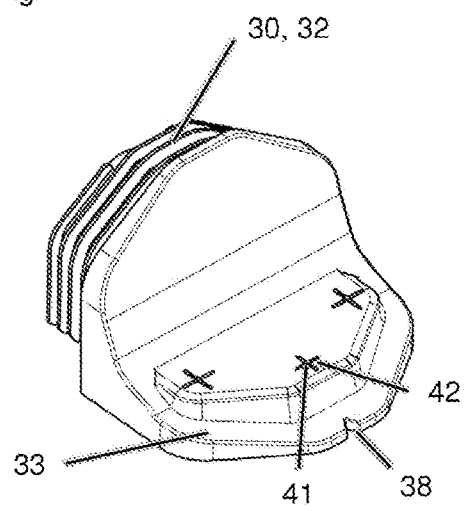
FIGS. 1 to 4 are different views of an end cap according to the invention of a rail arrangement according to the invention of a fastening arrangement according to the invention.

The drawings show different views of a fastening arrangement according to the invention and the individual parts of the fastening arrangement.

The fastening arrangement comprises a profile rail 10, at least one end cap 30, and at least one fastening pin 60.

The profile rail 10 is intended for embedding into concrete and comprises a rail body 11. The profile rail 10 is designed as an anchor rail and as such comprises a plurality of anchors 18, which are arranged on the rail body 11. The rail body 11 is C-shaped and has, on its upper face, an elongate rail slot 13, through which access to the interior of the rail body 11 is possible. The rail slot 13 is delimited by two opposing rail lips 14, to which a hammer head bolt guided through the rail slot 13 can be fixed. In the embodiment shown, the anchors 18 are connected to the rail body 11 on the rear face of the rail body 11 opposite the rail slot 13. In principle, however, another arrangement of the anchors 18 is conceivable, for example on the side of the rail body 11.

The rail body 11 is delimited by two opposing side faces, between which the rail slot 13 extends. At least one of these side faces of the profile rail 10 is closed by an end cap 30. The end cap 30 comprises a connector 32 which is designed as a plug-in connector and is inserted into the rail body 11. In order for even better connection to the profile rail 10, the connector 32 is provided with peripheral contact ribs, for example, although these can also be dispensed with.

The end cap 30 further comprises a fastening leg 33 for fastening the rail body 11, and therefore the profile rail 10, to a formwork. The fastening leg 33 comprises a contact surface 95 for the formwork, which contact surface extends at least approximately in the plane spanned by the rail slot 13 and/or the rail lips 14.

The fastening pin 60 has a shank 62 and a head that has a larger cross section than the shank 62. In the embodiment shown, the fastening pin 60 is designed without a thread as a nail. However, it can also be designed as a screw. The fastening pin 60 is used to fasten, in particular nail, the rail arrangement to the formwork.

The fastening leg 33 of the end cap 30 has an opening 40 through which the fastening leg 33 of the end cap 30 extends from the back to the front, which opens into the contact surface 95 for the formwork, and/or which is provided so that the shank 62 of the fastening pin 60 can be guided therethrough. The opening 40 has a smaller cross section than the head 61 of the fastening pin 60, such that the head 61 can anchor the fastening pin 60 guided through the opening 40 to the end cap 30.

The end cap 30 further comprises four circular sector-shaped tabs 42, which protrude into the opening 40 at the rear end of the opening 40, i.e., at the end remote from the contact surface 95 for the formwork. These tabs 42 form a flexible local cross-sectional constriction 41, which can temporarily hold the shank 62 of the fastening pin 60 during installation of the rail arrangement on the formwork.

Figure 2:
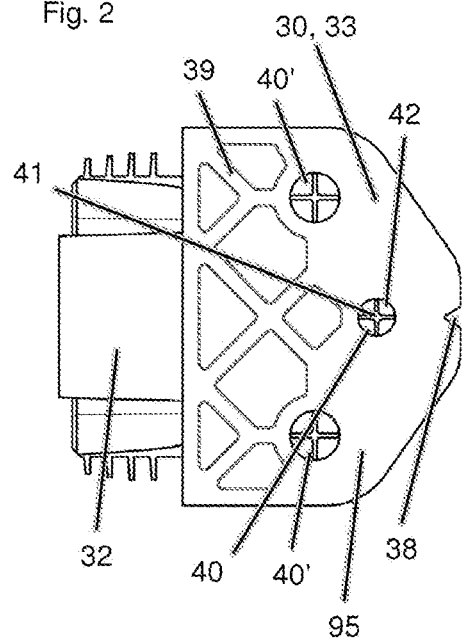
Figure 3:
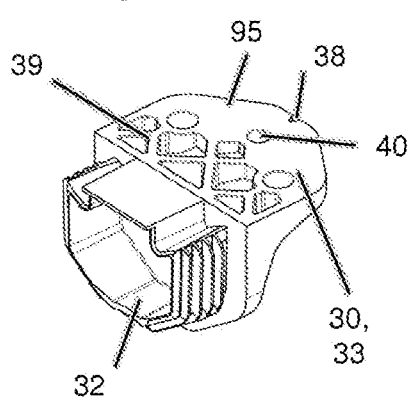
Figure 4:
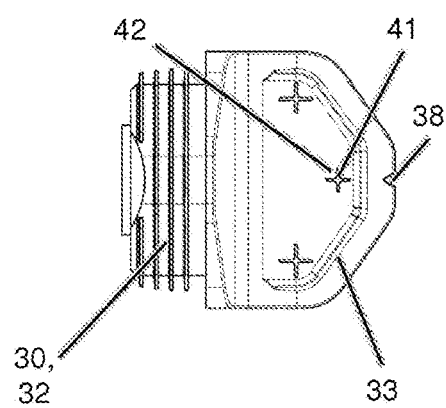
Figure 5:
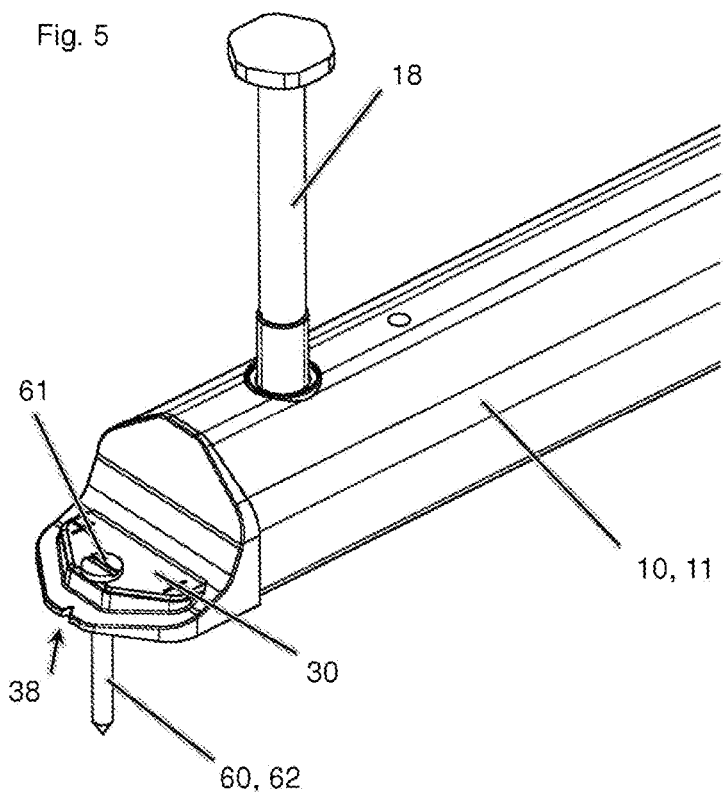
FIG. 5 is a perspective detail view from below of a fastening arrangement according to the invention having an end cap according to FIGS. 1 to 4.
Figure 6:
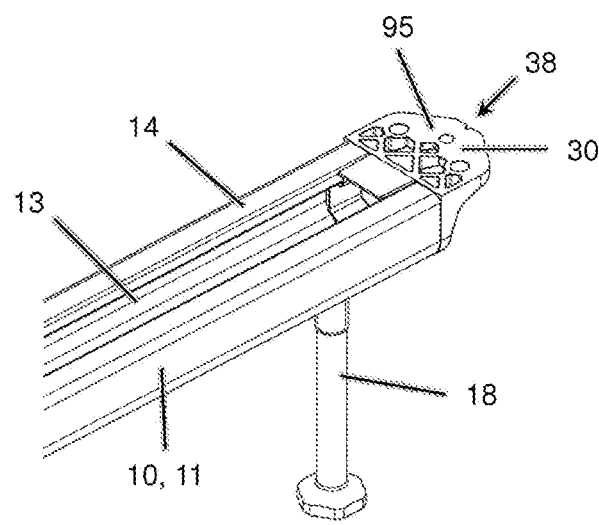
FIG. 6 is a perspective detail view from above of the rail arrangement of the fastening arrangement according to FIG. 5.

In the embodiment shown, the fastening leg 33 of the end cap 30 has two more openings 40' for additional fastening pins (provided with reference signs only in FIG. 2 for reasons of clarity), which openings, analogously to the opening 40, also have tabs for forming a cross-sectional constriction. In the embodiment shown, the further openings 40' have a larger cross section than the opening 40 by way of example.

For particularly easy positioning of the rail arrangement, the end cap 30 comprises a centering marking 38, which is arranged in the extension of the rail slot 13, and which therefore permits easy positioning of the rail slot 13 of the profile rail 10. In this case, the centering marking 38 is designed as a notch in the end cap 30 by way of example.

For a particularly robust, but material-saving, design, the end cap 30 comprises internal reinforcing ribbing 39.

The invention claimed is:

1. An end cap for a profile rail, comprising:
a connector for connecting the end cap to the profile rail;
a centering marking, wherein the centering marking is a centering notch for centering the profile rail; and
a fastening leg, wherein the fastening leg defines an opening and wherein a fastening pin is guidable through the opening to mount the profile rail;
wherein the opening has a cross-sectional constriction and wherein the fastening pin is holdable in the opening by the cross-sectional constriction;
wherein the cross-sectional constriction is formed by a plurality of circular sector-shaped tabs.

2. An end cap for a profile rail, comprising:
a connector for connecting the end cap to the profile rail;
reinforcing ribbing; and a fastening leg, wherein the fastening leg defines an opening and wherein a fastening pin is guidable through the opening to mount the profile rail;

wherein the opening has a cross-sectional constriction and wherein the fastening pin is holdable in the opening by the cross-sectional constriction;

wherein the cross-sectional constriction is formed by a plurality of circular sector-shaped tabs.

3. A rail arrangement, comprising:

a profile rail; and an end cap, wherein the end cap includes:
  a connector;
  a centering marking, wherein the centering marking is a centering notch for centering the profile rail; and
  a fastening leg, wherein the fastening leg defines an opening and wherein a fastening pin is guidable through the opening to mount the profile rail;
  wherein the opening has a cross-sectional constriction and wherein the fastening pin is holdable in the opening by the cross-sectional constriction;
  wherein the cross-sectional constriction is formed by a plurality of circular sector-shaped tabs;

wherein the end cap is connected to the profile rail by the connector of the end cap.

4. A fastening arrangement, comprising:

a rail arrangement, wherein the rail arrangement includes:
  a profile rail;
  an end cap, wherein the end cap includes:
    a connector;
    a centering marking, wherein the centering marking is a centering notch for centering the profile rail; and
    a fastening leg, wherein the fastening leg defines an opening;
    wherein the opening has a cross-sectional constriction;
    wherein the cross-sectional constriction is formed by a plurality of circular sector-shaped tabs;
  wherein the end cap is connected to the profile rail by the connector of the end cap; and a fastening pin, wherein the fastening pin is disposed in the opening of the end cap and held in the opening by the cross-sectional constriction.

5. The fastening arrangement according to claim 4, wherein the fastening pin is a nail or a screw.

6. The end cap according to claim 1, wherein the cross-sectional constriction is a flexible cross-sectional constriction formed by four circular sector-shaped tabs which protrude into the opening at a rear end of the opening.

7. The rail arrangement according to claim 3, wherein the cross-sectional constriction is a flexible cross-sectional constriction formed by four circular sector-shaped tabs which protrude into the opening at a rear end of the opening.

8. The fastening arrangement according to claim 4, wherein the cross-sectional constriction is a flexible cross-sectional constriction formed by four circular sector-shaped tabs which protrude into the opening at a rear end of the opening.

9. The rail arrangement according to claim 3, wherein the end cap further includes reinforcing ribbing.

10. The fastening arrangement according to claim 4, wherein the end cap further includes reinforcing ribbing.

* * * * *